Patented Aug. 8, 1939

2,168,349

UNITED STATES PATENT OFFICE 2,168,349

TRICHLOR METHYL AROMATIC CARBINOL ETHERS

Lucas P. Kyrides, Webster Groves, Mo., assignor to Monsanto Chemical Company, St. Louis, Mo., a corporation of Delaware No Drawing. Application December 11, 1935, Serial No. 53,903

3 Claims. (Cl. 260—613)

The present invention relates to trichlormethyl carbinol substituted derivatives of aromatic ethers, and it has particular relation to such compounds when the aromatic group comprises a mono-ether of pyrocatechol.

The main objects are to provide trichloromethyl carbinol derivatives of mono ethers of pyrocatechol in which the ether group contains a hydrocarbon radical of relatively high molecular weight:

To provide compounds of the above indicated character which are valuable as intermediates in the preparation of perfumes, flavoring ingredients, pharmaceuticals and the like.

To provide a simple and economical method of preparing such materials.

These and other objects will be apparent from perusal of the following specification and the appended claims.

It has heretofore been proposed to prepare aldehyde derivatives of the relatively complex mono ethers of pyrocatechol by reacting the pyrocatechol ether with formaldehyde in the presence of a suitable catalyst. The process was not entirely satisfactory because the yields, especially where compounds with large hydrocarbon groups in the alkyl side chains were employed as starting materials, were low. In many instances this method was found to be wholly inapplicable. Furthermore, it was impossible to control satisfactorily the position assumed by the aldehdye group in the benzene nucleus. Usually a mixture of three possible isomers was obtained, and separation of such mixture into its components was not uniformly successful.

The present invention involves the discovery that a new class of compounds eminently suitable for the preparation of these complex aldehydes and other valuable products may be obtained by reaction of chloral hydrate with the desired ether of pyrocatechol. The reaction involved in the preparation of the new compounds proceeds as follows:

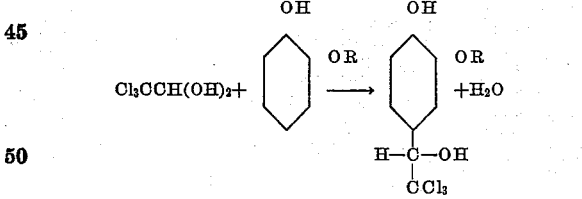

where R is a hydrocarbon radical comprising at least 3 carbon atoms including specifically benzyl, phenyl, butyl, amyl and cyclohexyl.

In this reaction various promoters may be employed, but as an example of such, mention is made of a mixture of sodium sulfite, sodium phosphate, and sodium carbonate. Alkali salts of monoethers of catechol may also be employed in the reaction if so desired.

The following constitute specific examples of the application of the invention:

*Example 1.*—Preparation of metabenzyl ether of parahydroxyphenyl trichloromethylcarbinol.

A ¼ molar proportion (50 parts by weight) of mono benzyl ether of catechol was charged into a container of suitable size, which was maintained at a temperature of 25°–30° C., and 43.5 parts by weight (¼mol+5% excess) of chloral hydrate together with 44 parts by weight of benzene were added thereto. To this mixture was added a dry mixture comprising 15.6 parts by weight (⅛ mol) of sodium sulphite and 2.6 parts by weight (¹⁄₄₀ mol) of sodium carbonate. The reaction mixture was then agitated for between two and three weeks; during this time any solid materials collecting upon the sides of the container were washed down periodically with small portions (44 pts. by weight) of benzene. Three washings were found to be adequate.

At the conclusion of the reaction the solids were filtered off and washed well on the filter with benzene. The material was then dried. The dry material was mixed with 75 parts of water by weight in order to form a slurry and was again subjected to fitration and finally it was again dried. The material was purified by recrystallization from dilute alcohol. The product had a melting point of 109.5° to 110.2° C. It was sufficiently pure that it was used in the further preparation of meta-benzyl ether of para hydroxybenzaldehyde without additional treatment, according to known methods for converting phenyltrichlormethyl carbinols to the corresponding benzaldehydes.

For this purpose the carbinol product thus obtained was charged into an autoclave in the ratio of 4.2 parts by weight along with 1.2 parts by weight of $K_2Cr_2O_7$, or the like oxidizing agent, 6.4 parts by weight of 50% NaOH solution, 50 parts by weight of water. The charge in the autoclave was heated to 150° C. and held at this temperature for a period of two hours. The reaction mixture was then cooled and extracted with chloroform. The weight of the crude material, which consisted mainly of parahydroxy metabenzyl ether of benzaldehyde constituted a yield of 92.2%. This material was crystallized from toluene and then once from 95% alcohol. The product had a melting point of 111.8 to 113.0° C.
The product has the formula

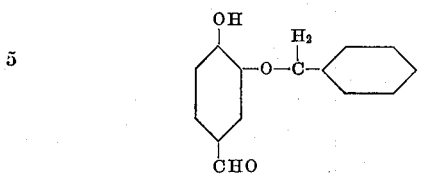

*Example 2.*—The metabutyl ether of parahydroxyphenyl trichlormethyl carbinol:

This material was prepared by admixing 41.5 parts by weight of mono-n-butyl ether of catechol with 43.5 parts by weight of chloral hydrate, a mixture of 15.8 parts by weight of sodium sulphite, with 2.6 parts by weight of sodium carbonate and 44 parts by weight of benzene in a container which was heated to 40° C. in order to dissolve the ingredients. It was then cooled to a temperature of 25° by running water and maintained approximately at that temperature during reaction.

The contents of the container were agitated continuously for a period of 3 to 4 days, when the reaction mixture became quite viscous and the addition of 44 parts by weight of benzene, was found to be desirable in order to promote agitation. Agitation was then continued. After three to four more days a third portion of benzene was added in order again to reduce the viscosity. The reaction required between two and three weeks in order to reach completion. At the end thereof, sufficient benzol was added to dissolve all of the product and the solution was filtered; a slimy mass remained on the filter and apparently consisted essentially of the sodium sulphite and sodium carbonate. This mass was extracted a number of times with benzene and the filtrates combined. The benzene was then evaporated until crystallization occurred. The crystals were recrystallized twice from benzene, yielding a product having a melting point of 107.6° to 109.2° C. The carbinol thus obtained was converted into the aldehyde as follows:

The above product in the ratio of 3.78 parts by weight was admixed with 1.2 parts by weight of potassium dichromate, 6.4 parts by weight of 50% sodium hydroxide solution, and 50 parts by weight of water in a metallic copper lined autoclave. The mixture in the autoclave was heated to 150° C. for a period of two hours. The autoclave was then opened, the contents acidified to Congo red with sulfuric acid and extracted with chloroform. The chloroform solution was filtered and the chloroform distilled off. The yield of crude product which consisted mainly of parahydroxy meta-n-butyloxybenzaldehyde constituted 97.3% of the the theoretical. This material crystallized and was further purified by distillation under a vacuum of 2 mm. The distilled product was crystallized from benzene and then washed with solvent gasoline. The product melted at a temperature ranging from 42.4 to 43.6° C.

In the foregoing example chloral may be substituted for the chloral hydrate specified.

*Example 3.*—Substitute an equivalent molar ratio of the phenyl or the normal or isoamyl ether of catechol for the benzyl or butyl ethers disclosed in Examples 1 and 2 and proceed substantially as outlined in the former example.

The corresponding ethers of the catechol derivatives of trichlormethyl carbinol will result. The trichlor carbinol group of course, may be oxidized to the aldehyde group by use of potassium dichromate, potassium permanganate or other oxidizing agent.

Although a considerable period of time is required for completion of the reaction of the chloral hydrate with the ether of catechol in the process described, this reaction does not require application of high temperatures and may be conducted in simple pots or containers which do not require any particular attention upon the part of the operator. Accordingly the expense involved in labor and apparatus is very low. If it is desired to convert the material into the corresponding aldehydes, the treatment with potassium dichromate and sodium hydroxide in an autoclave requires only moderate temperatures and is completed within a period of a few hours. The resultant product is obtained substantially free from isomers of the desired material and no manipulation for purposes of separating the isomers is required. For these reasons the process is highly desirable from a commercial viewpoint.

Although only the preferred embodiments of the invention have been disclosed it will be apparent to those skilled in the art that numerous modifications may be made therein without departure from the spirit of the invention or the scope of the appended claims.

Reference is made to my copending application, Serial No. 274,360, filed May 18, 1939, wherein are claimed various new compounds disclosed but not claimed herein.

What I claim is:

1. A new chemical compound having the formula:

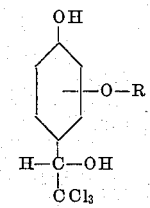

where R is a hydrocarbon radical selected from the group consisting of phenyl, benzyl and cyclohexyl.

2. As a new chemical compound 3-benzyloxy-4-hydroxyphenyl-trichloromethylcarbinol.

3. As a new chemical compound 3-phenyloxy-4-hydroxyphenyl-trichloromethylcarbinol.

LUCAS P. KYRIDES.